Nov. 16, 1965 C. ISAACSON 3,218,193

AUTOMATIC FOAM FLUXING

Filed Sept. 19, 1961 3 Sheets-Sheet 1

INVENTOR.
CALVIN ISAACSON
BY
DIKE, THOMPSON, BRONSTEIN & MROSE
ATTORNEYS

INVENTOR.
CALVIN ISAACSON
BY

DIKE, THOMPSON, BRONSTEIN & MROSE
ATTORNEYS

Nov. 16, 1965 C. ISAACSON 3,218,193

AUTOMATIC FOAM FLUXING

Filed Sept. 19, 1961 3 Sheets-Sheet 3

INVENTOR.
CALVIN ISAACSON
BY

DIKE, THOMPSON, BRONSTEIN & MROSE
ATTORNEYS

United States Patent Office 3,218,193

Patented Nov. 16, 1965

3,218,193
AUTOMATIC FOAM FLUXING

Calvin Isaacson, Wellesley, Mass., assignor, by mesne assignments, to Leesona Corporation, Warwick, R.I., a corporation of Massachusetts Filed Sept. 19, 1961, Ser. No. 139,265
5 Claims. (Cl. 117—113)

Figure 1:
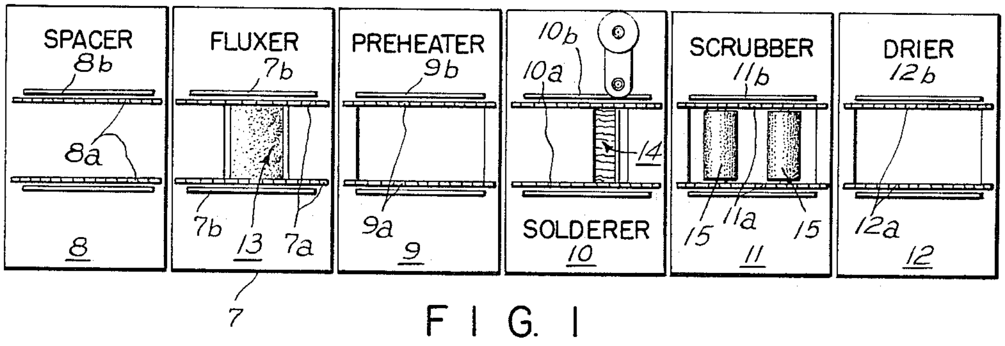

The present invention relates to improvements in the application of coatings to articles and, in one particular aspect, to improved apparatus of low-cost construction for automatically and reliably depositing a thin layer of a liquid fluxing agent upon surfaces of printed electronic circuit boards or the like through controlled foaming actions.

As is now well established in the art, laborious skillful manual wiring of electrical circuitry is yielding to highly automated techniques for forming electrical circuit interconnections, particularly where the required connections are numerous, the parts are miniaturized and compactly arrayed, and the needed production rates and quantities are high. In this connection, various forms of so-called "printed" circuitry have been evolved and, by way of one example, these may comprise a board-like chassis provided with a desired maze of electrically conductive paths formed by printing, coating and chemical removal steps, the conductive paths then serving to interconnect electronic circuit components affixed to the board. The requisite electrical and mechanical bonding of components to the conductive paths of the board is preferably accomplished by an automated soldering involving some form of dipping, spraying, or washing with molten solder, but in any event it is essential that the surface areas to be united or coated by solder first be prepared by the application of a suitable soldering flux which will react with unwanted oxides and films and will otherwise promote strong and permanent soldering. Brushing, sponging, dipping and spraying techniques have been exploited for the latter purposes, although these have not proved to be as reliable, swift and uncomplicated as would be liked, and do not well lend themselves to fully automated processing of printed circuit boards. According to the present teachings, however, applications of continuous coatings or layers of substances in the liquid state may be made even upon irregular surfaces, and while minimizing difficulties of the aforesaid character, through practices involving the continuous foaming of minute bubbles which are caused to flow in a prescribed course relative to articles being coated.

It is one of the objects of the present invention, therefore, to provide improved automatic coating of surfaces involving the generation of a mass of foam comprising minute bubbles of a coating substance in a liquid state flowing in a recirculation path wherein contact is made with the surfaces to be coated.

Further, it is an object to provide novel and improved apparatus for continuously developing and applying to processed articles fine foam of a liquid substance.

Still further, it is an object to provide improved fluxing apparatus wherein liquid soldering flux is converted into foam comprising minute bubbles and is directed against surfaces of transported printed circuit boards to apply continuous uniform coatings of flux.

It is also an object to provide liquid-foam coating apparatus of uncomplicated and compact construction lending itself to low-cost fabrication as a self-contained modular unit for automatically applying coatings to surfaces at high production rates.

By way of a summary account of practice of this invention in one of its aspects, a container of soldering flux which is in a liquid state at room temperatures is supported below a central aperture in the top of an accommodating console or cabinet structure, from whence a mass of fine foam generated from the liquid flux may rise to a level above the top of the console where it may be wiped by flat printed circuit boards being transported horizontally across the top of the console upon a spaced pair of motor-driven endless conveyor chains. When aligned with other cooperating console units having provisions for delivering the printed circuit boards onto its conveyor for fluxing and, thereafter, for receiving the flux-coated boards and applying solder, cleaning agents and the like, the foam fluxing unit conveniently performs a critical role in an automated high-speed soldering operation. For these purposes, the container of liquid flux is provided with a submerged semi-porous foaming member through which pressurized air is continuously forced and divided into many small discrete streams which develop minute globules or bubbles of flux which rise to and above the surface of the liquid flux through an open-topped inclosed vertical passage. The vertical passage is preferably of elongated rectangular cross-section and is of width substantially the same as the spacing between the conveyor chains, whereby a mound of finely-foamed flux is developed substantially transversely to the direction in which printed circuit boards are carried by the conveyor. An inclined lip at the leading edge of the open-topped passage causes the mound of continuously-rising foam to displace itself slightly in the direction of movement of the transported boards, and the flux container is in an opened surrounding relationship which enables overflow of the foamed flux to gravitate back into the container where it reduces itself to liquid form and is available for recirculation. Oncoming printed circuit boards encountering the mound of foamed flux automatically cause it to be levelled at the height of their lower surfaces, and the wiping action of the latter surfaces against the continuously-replenished foam results in breaking of the minute bubbles and attendant application of a desired thin continuous film of flux to the boards.

Figures 3, 4:
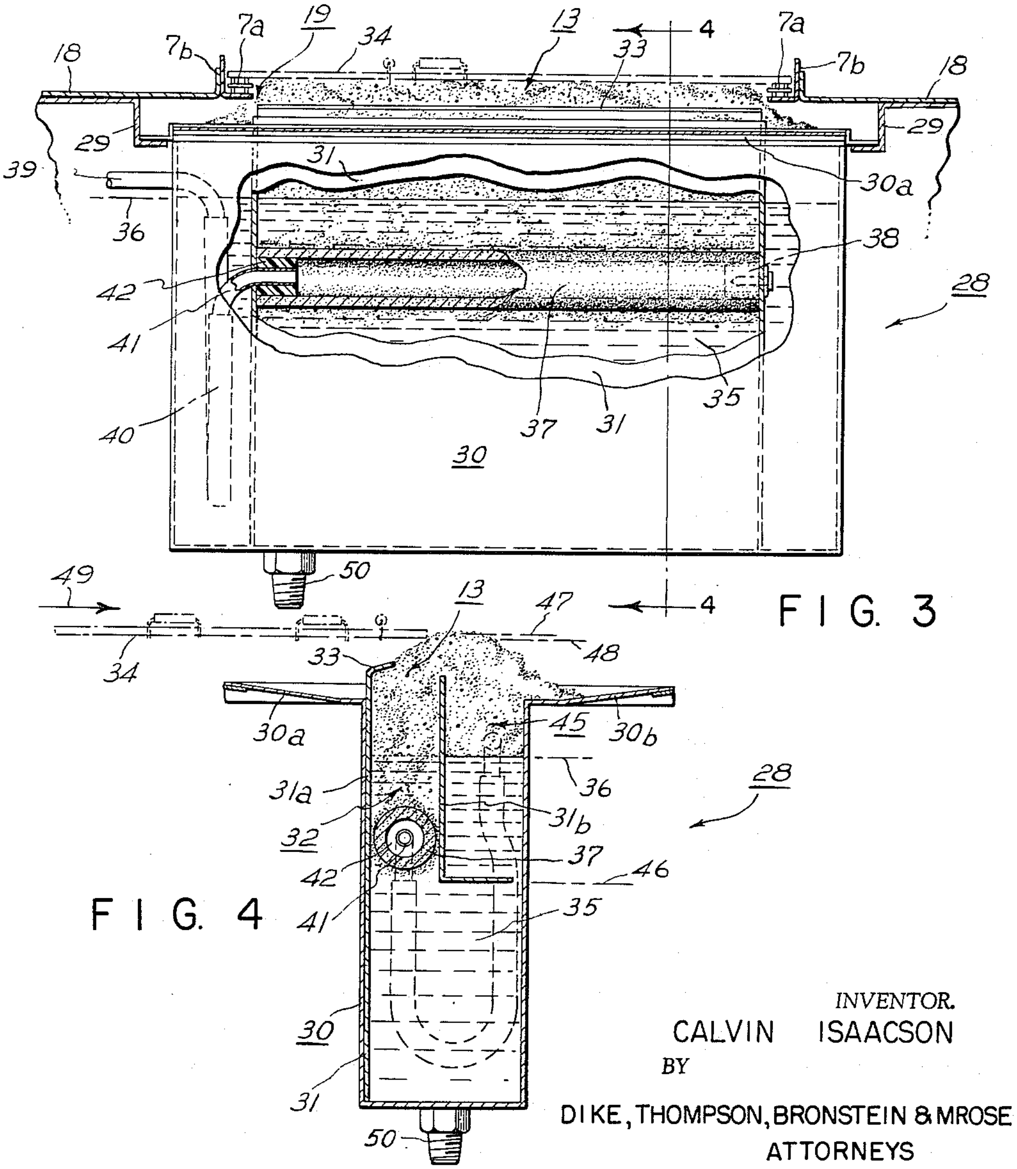
Figure 2:
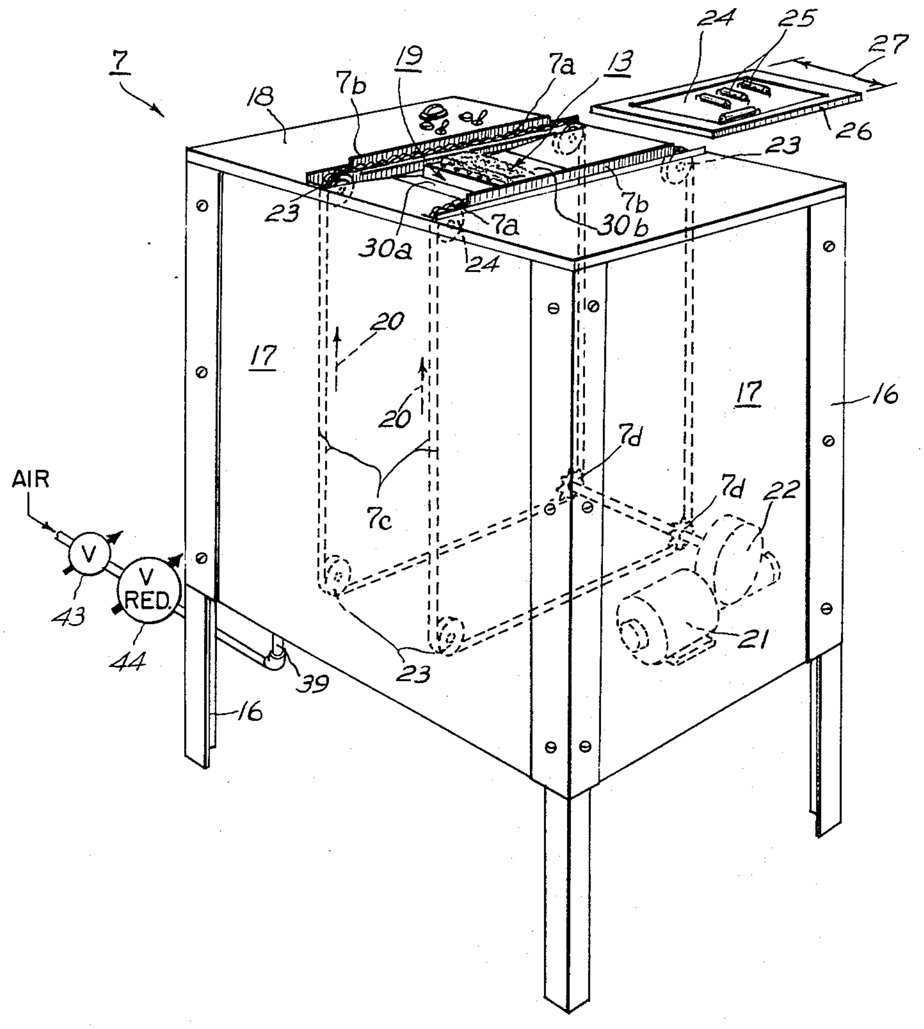
Figure 5:
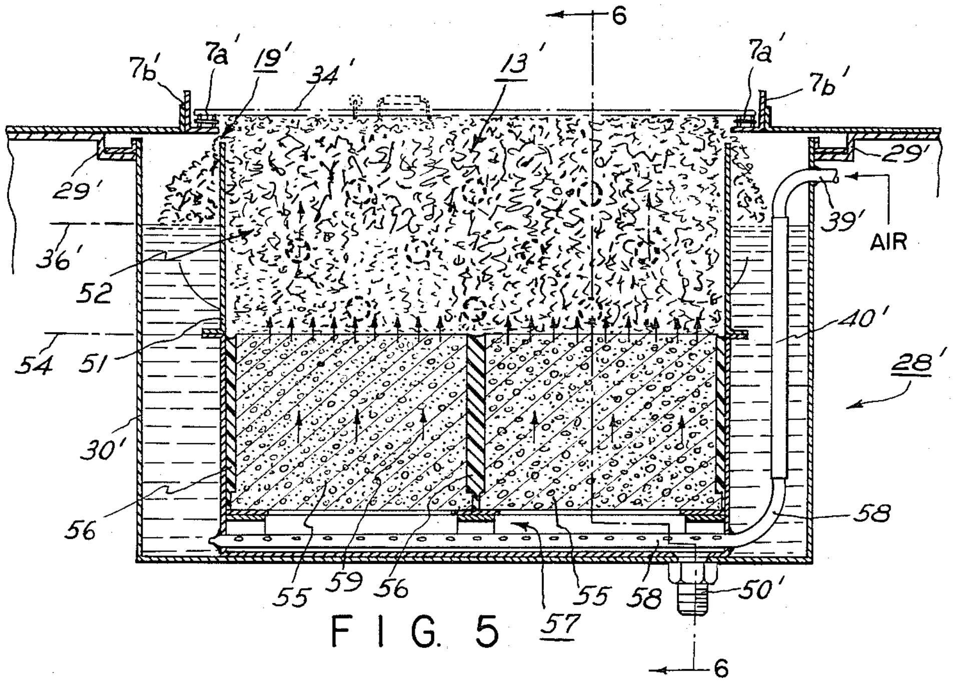
Figure 6:
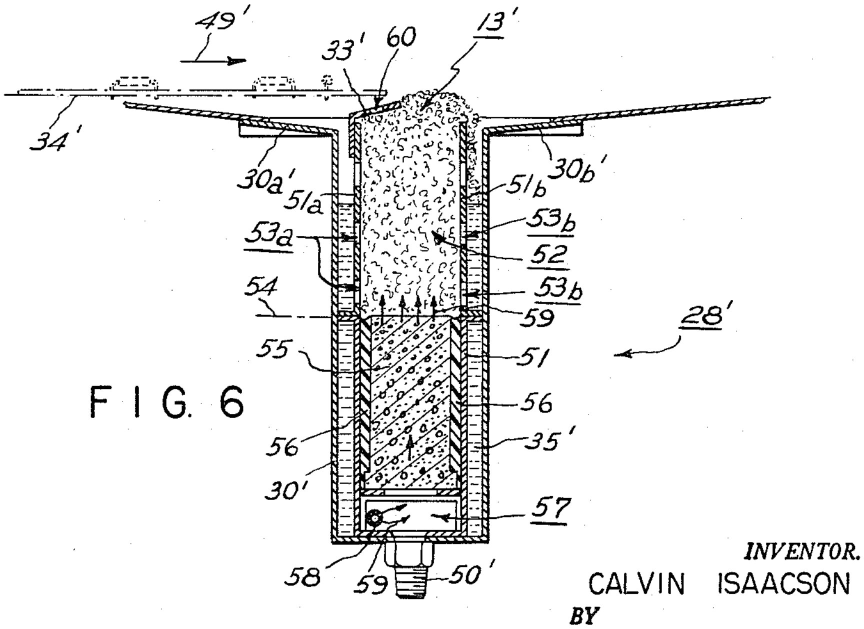

Although the features of this invention which are believed to be novel are set forth in the appended claims, further details as to preferred practice of the invention, as well as to the objects and advantages thereof, may be most readily appreciated through reference to the following description taken in connection with the accompanying drawings, wherein:

FIGURE 1 presents a plan view of a group of cooperating modular units used in connection with automatic fluxing and soldering of printed circuit boards;

FIGURE 2 is a pictorial representation of a console-type automatic foam fluxing unit, with conveyor elements shown partly in phantom view and with a typical printed circuit board assembly shown as it is leaving the conveyor;

FIGURE 3 provides an end view of one preferred foam-fluxing sub-assembly suitable for use in the console unit of FIGURE 2, with certain parts broken away to expose inner constructional details;

FIGURE 4 is a transverse cross-section of the sub-assembly of FIGURE 3 taken along section lines 4—4 in that figure;

FIGURE 5 provides a cross-sectioned end view of an alternative form of foam-fluxing sub-assembly suitable for use in the console unit of FIGURE 2; and FIGURE 6 is a transverse cross-section of the sub-assembly of FIGURE 5 taken along section lines 6—6 in that figure.

The automatic application of coatings as taught by the present invention is advantageously practiced in connection with the fluxing of printed circuit boards which are to be processed in an automated soldering system. For such purposes, a self-contained console-type fluxing unit or module, 7, is shown in FIGURE 1 to be integrated in an in-line relationship with a spacer 8, preheater 9, solderer 10, scrubber 11 and drier 12 of like configurations, each of which includes an independent motorized drive for its independent pair of spaced conveyor chains, these being identified by the same reference character with the distinguishing subscript *a* added. All of the exposed conveyor chains move at about the same speed and in the same direction, from left to right in the illustration, and are disposed to transport sequentially from left to right flat printed circuit boards which have been placed upon the leftmost conveyor chains 8*a* of the simple spacer unit 8 by an operator. Flanges 7*b*–12*b* which rise above the level of the conveyor chains and are parallel to them, serve as guides which prevent the transported boards from sliding laterally. Proximity of the independent but aligned conveyors of the adjacent modules insures that the boards leaving one module will be thrust onto and carried forward by the next. In a typical operation, a clear-printed circuit board (not shown) is first rested upon the spaced conveyor chains 8*a*, between the flanges 8*b*, whereupon it is transported horizontally onto the fluxer 7 where its lower surfaces, including surfaces of downwardly-projecting leads and the like are then wiped across a specially-produced mound of fine-bubble foam 13 of a liquid fluxing agent. Thereafter, the preheater module 9, which may include an infra-red radiant surface, elevates the temperature of the printed circuit board to dry out flux solvents and to prepare it for subsequent soldering by reducing the likelihood of thermal shock, spattering, or the like, upon its encountering a wave of molten solder 14 developed by the solderer unit 10. The boards as delivered to scrubber 11 are fully soldered at the intended sites, and unit 11 then serves to clean the flux residues from the lower surfaces by scrubbing rinsing fluid onto these surfaces with rotating brushes 15. Finally, drier module 12 removes any remaining moisture, as by circulation of warm dry air past the lower surfaces of the board, and delivers the board to a waiting operator or to a further conveyor for other processing.

As shown in the FIGURE 2 illustration, the fluxer module 7 includes framework elements 16 and side panels 17 which cooperate with a rectangular horizontal top cover 18, the latter having a substantially central opening 19 which is also generally rectangular and which spans the space between conveyor chains 7*a*. Dashed linework 7*c* designates the path of these endless chains within the console where they are driven in the direction of arrows 20 by the sprockets 7*d* which are rotated by an electric motor 21 through a gearbox 22. Guide rollers 23 support the conveyor chains and position them for the intended movements. A small printed circuit panel or board, 24, having the usual electric circuit components 25 with leads projecting through the boards to sites of connection below the board, is depicted in the position where it has just been transported across the module 7 for application of a flux coating and has left its conveyor chains. The board 24 is there of less width than that of the span between chains 7*a* and, for this reason, is nested into the accommodating opening of a simple adapter board or fixture 26 of the appropriately larger width 27 which enables it to rest upon the chains near its edges and to be kept in the proper track of movement by the raised guide flanges 7*b*. Fixture 27 is conveniently of a low-cost material such as a common pressed composition board.

Fluxing is achieved upon contact between the transported board and the mound of foam 13 of a liquid fluxing agent. The multitude of bubbles comprising this foam are air-filled and are of minute diameters, such as diameters of the order of about 1/16 inch. As is explained later herein, the foam is generated continuously during operation of the fluxer, whereby those which break and become deposited upon the printed circuit board are quickly replaced by others automatically raised from below. It is found, advantageously, that the minute bubbles do not remain in globular form upon the board but, instead leave a highly uniform film or coating upon the board surfaces. This is true despite certain small irregularities in the board, and one important asset of this resides in the fact that the flux coating likewise extends into the lead-accommodating openings through the board, such that solder will also penetrate into these openings and develop a secure bond of the component leads with the proximate solderable portions of the board. Although the foam is generated continuously, such portions as are not deposited upon the printed circuit boards are recovered as liquid and are recirculated without loss, and, although no printed circuit boards are being processed at certain times, the mound of flux nevertheless does not build up excessively but is self-regulating in height and is slowly self-propelled for purposes of automatic recirculation. Structure which achieves these characteristics in a particularly effective manner appears in the views of FIGURES 3 and 4, wherein the sub-assembly 28 for generating the desired foam mass 13 is mounted on brackets 29 below the top cover 18 of the console and in registry with its central opening 19. This includes an outer liquid-tight sheet-metal tank 30 of generally rectangular configuration which is open at the top where it merges with upwardly-inclined forwardly and rearwardly-extending lip surfaces, 30*a* and 30*b*, respectively, which are part of an integral barrier designed to capture overflow. Nested within this outer tank or container is a further sheet-metal partitioning unit 31 which, as shown in FIGURE 3, is of a width less than that of tank 30 and about the same as the span between the two conveyor chains 7*a*. The partitioning unit, forming an inner container, is centered in relation to the longer dimension of the tank, although, as shown in the transverse view of FIGURE 4, its narrower upper portion forming a vertical passageway 32 of about half the tank thickness and disposed to one side in the direction from which the printed circuit boards are transported across the module. Further, a rearwardly-inclined lip 33 is provided at the leading edge of the vertical passageway, this lip and the other top edges of the partitioning unit being disposed at a level slightly below that at which printed circuit boards, such as the board 34 outlined in dashed-line form, are transported by the conveyor.

Container 30 holds a pool or reservoir of a liquid soldering flux 35 the surface level 36 of which is well below the top edges of the tank and partitioning unit. Fluxing agent 35 may comprise liquids which utilize derivatives and salts of hydrazine, such as hydrazine monohydrobromide, as the active fluxing material, in a water solution also including minor quantities of other materials such as ethylene glycol. Typical formulations of aqueous solutions may range from about 2 to 15 percent concentrations (0.17 lb./gal. to 1.36 lb./gal.) of hydrazine monohydrobromide. Alternatively, other soldering fluxes, such as those containing zinc chloride, may be used. Within the vertical passageway 32 of the inner partitioning unit, and below the surface level 36 of the liquid flux, there is mounted a hollow substantially cylindrical tube 37 which is semi-porous in that it permits the escape of pressurized air from within while remaining substantially impervious to flow of the liquid flux from without. One suitable construction of such a tube involves a granular ceramic, such as aluminum oxide, molded together with a binder material. Tube 37 is of about the same length as the span between the conveyor chains and is mounted substantially horizontally between the end walls of the vertical passageway 32. Its outer diameter is less than the spacing between the side walls **31*a* and 31*b* of the vertical passageway, such that spacings between the tube and these walls enables liquid flux and generated foam to rise past the tube. One end of the hollow semi-porous tube is closed by a plug 38, while at the opposite end the hollow interior is coupled with a pressurized-air supply pipe 39 by way of flexible tubing 40, tubular coupling 41, and hollow plug 42. Valve 43 and reducing valve 44 in the air supply line (FIGURE 2) provide control over the supply, which may be a source of common air at a moderate pressure of about 10 lbs. per square inch. The pressurized air in tube 37 is forced through the minute interstices which exist throughout the semi-porous material and, upon escaping into the surrounding liquid flux, develop minute bubbles which ascend to form the self-rising mound of foam 13 atop the vertical passageway. This foam is developed only within the passageway itself, and not in the section 45 of the tank which is to the rear of it, the latter being intentionally preserved quiescent. Rear wall 31*b* of the passageway has its lower edge at a level 46 which is below the semi-porous tube, such that the foam bubbles are trapped within the passageway, although the passageway is elsewhere in fluid communication with the tank so that the liquid flux may continuously reach and surround the semi-porous tube for the purposes of generating foam. The somewhat coarse and granular semi-porous material of tube 37** is of substantially uniform characteristics throughout its length and thereby advantageously promotes the formation of foam at about the same rate throughout the span of the vertical passageway.

As the foam is generated and rises through floatation of the bubbles in the vertical passageway, gradually filling it above the level 36 of the liquid, some of it encounters the rearwardly-inclined lip near the leading (i.e., forward) edge and is deflected rearwardly. This action is continuous, with the result that, although the mound of foam rises above the top of the tank and inner partitioning to a level 47 which is slightly higher than the level 48 of the lower surfaces of a processed board 34, the foam is constantly being displaced rearwardly over the top edge of the rear partition wall **31*b* from whence it gravitates downwardly into the rear tank section 45. Foamed flux which overflows in this manner contacts the rear surfaces of wall 31*b*, or the inclined surfaces of lip 30*b*, or the surface of the liquid flux, whereupon its bubbles break and return to the reservoir of flux as liquid for recirculation in the system. The foam is thus constantly replenished and is clean, and is supplied in sufficient quantity to coat the lower surfaces of the printed circuit boards without leaving voids, even where irregularities appear. It is also found that the absolute height or level 47 to which the foam mound rises is advantageously not critical, except that it must be higher than the level 48 of the lower surfaces of the boards, because the oncoming thin boards moving in the direction of arrow 49 do not cut progressively into the foam but, instead, have the effect of pushing it rearwardly where the unwanted excess merely gravitates back into the tank of its own accord. For this reason, the top surfaces of the boards, which are to remain clear of flux, are not coated with the flux even though the foam mound should rise somewhat above the illustrated level 47. Manual adjustments of pressure-reducing valve 44 provide a control over the air supply and, thereby, a control over the rates at which the foam is generated as well as the heights to which the mound of foam rises. Drain pipe 50** facilitates periodic drainage and refilling with clean flux.

In the alternative embodiment of a foaming unit subassembly which appears in the views of FIGURES 5 and 6, features which correspond functionally with those of the preceding figures are for convenience identified by the same reference characters with distinguishing single-prime accents added. The sheet-metal open-topped outer container or tank, 30′, is suspended below and in registry with the top opening 19′ of the foamer console and serves as a reservoir for a pool of liquid fluxing agent 35′ which is to be foamed for purposes of applying a coating to transported printed circuit boards such as the outlined board 34′. As in the case of the embodiment described earlier herein, the foam originates within an inner container or tank, 51, which forms a vertical pasageway, 52, within which the generated foam may rise to form the desired exposed mound 13′ at the top and extending transversely in relation to the direction of movement of the oncoming boards. The front and rear walls **51*a* and 51*b*, respectively, of the inner tank are open to the liquid flux 35′ in the surrounding outer tank 30′ only by way of the perforations 53*a* and 53*b* above the level 54 of porous block members 55, the inner tank otherwise being sealed liquid-tight to prevent entry of liquid flux below this level. Block members 55 are sealed with the inner tank by cement 56, such that the pressurized air admitted to a lower chamber 57 by way of supply pipe 39′, flexible tubing 40′ and a perforated supply tube 58, may escape to the liquid flux only through the porous blocks. Tube 58, which is sealed with the inner tank 51 by brazing or the like, is preferably perforated regularly along its length to promote an even pressure distribution within the chamber or cavity 57 which lies below and is in direct communication with the porous blocks. Arrows 59 indicate the air flow paths from the perforated tubing, into the hollow cavity, and through the block members to multitudinous points of release of small streams of air which develop the foam of flux rising in the vertical passageway 52. Block members 55 are conveniently in the known form of ceramic bricks (firebricks) which are cellular and afford numerous small tortuous passageways for flow of the air which it breaks up into divided minute streams. This porosity is substantially unilateral, in that the pressurized air may flow to generate the needed foam while the liquid flux becomes trapped near the top surfaces of the blocks and cannot seep through them in the downward direction. The obstruction of any material flow of liquid flux through the blocks is highly advantageous in that the air supply path does not tend to become clogged during shut-down periods when the foaming equipment is not being operated. In an alternative construction, however, the porous blocks may be replaced by a mass of small particles such as small glass beads, shot, steel balls, stones, or the like, preferably of diameter less than about one-fourth inch, these being large enough such that they do not obstruct the small openings in the perforated air supply tube while yet being small enough and closely packed to break up the air supply into many small streams. When a mass of such particles, or their equivalent in a mesh or the like, is used, the supply tube corresponding to perforated tube 58 in FIGURES 5 and 6 may advantageously be made sinuous or in many parts to underlie as much as possible of the mass of stream break-up material above it, thereby promoting uniform generation of foam. Sintered glass or metal, having desired semi-porous characteristics may also be employed in the construction of porous blocks or tubes such as blocks 55** and hollow tube 37. In one preferred form, the semi-porous tube 37 includes about 82% of $Al_2O_3$ and 13% of $SiO_3$, the granular particles which make up the tube being of about 120-mesh size, and the pores being of about 60-micron size. The porosity of such a tube is advantageously about 35% (i.e. the precentage ratio of pore space, by volume, to the bulk volume of the tube), and possesses a permeability which permits about 2 cubic feet of air to flow per minute for each square foot of area and for each inch of thickness, under a pressure differential of about 2 inches of water.

The relatively narrow transverse lip 33', which is disposed along the leading edge of inner tank 51 and which extends rearwardly from it, is shown to be provided with small holes, 60, about a dozen or so in one construction. These are distributed along the lip to prevent the accumulation of air pockets which might otherwise develop and impair proper operation, particularly where the lip is very nearly horizontal. As appears from both FIGURES 5 and 6, the inner tank 51 is spaced from the outer tank 30' on all sides but the bottom, whereby liquid flux from the pool may more readily and uniformly enter the top portion of the inner tank and any overflow of foamed flux may more readily recirculate in the foamer by gravitating back into the liquid pool. It will be apparent that the teachings herein apply to the coating of articles with a variety of substances which have the surface tension characteristics permitting gas bubbles to become dispersed in them and to rise as foam which will break and deposit the desired layers. In this manner, varnishes and the like may be deposited, for example. Where the foamed liquid may be favorably affected by the use of certain gases, such as an inert gas, this may be supplied for foaming, rather than common dry air.

Those skilled in the art will appreciate that the specific constructions illustrated and described may be altered in certain practices of this invention, and it should therefore be understood that various changes, modifications and substitutions may be effected without departure from these teachings and that it is aimed in the appended claims to embrace all such variations as fall within the true spirit and scope of the invention.

What I claim as new and desire to secure by Letters Patent of the United States is:

1. Apparatus for applying a coating of substance in liquid form to a substantially planar surface of an article, comprising a tank having a pool of the liquid substance therein having surface tension characteristics permitting gas bubbles to become dispersed therein and to rise as foam which will break and deposit said substance in liquid form on the substantially planar surface of the article, a container within said tank and pool of liquid substance having a substantially enclosed and upright passageway open at the top and extending from below to above the surface of said liquid substance, said container being in fluid communication with the liquid substance in said tank and thereby having a quantity of said liquid substance within said passageway, semi-porous means below the surface of said liquid substance in said passageway, said semi-porous means having a multitude of minute spaces through which gas may be forced and which resist the seepage of said liquid substance therethrough, means continuously forcing gas through said semi-porous means into said liquid subtance in said container below the surface of said liquid substance in said passageway at a rate developing minute bubbles within said substance which rise to and above the surface thereof and thereby producing a self-rising mound of finely-foamed substance rising above the open top of said passageway, surfaces defining said substantially enclosed upright passageway being in laterally surrounding relationship to the foamed substance rising therein and preventing said foamed substance from escaping therefrom other than through the open top of said passageway, means transporting the article to be coated in one direction over the top of said passageway and across said mound of foamed substance with said planar surface thereof lowermost and in wiping contact with said mound, and means forming an overflow passageway adjacent said container and disposed at least downstream thereof with reference to said transporting direction, said overflow passageway being open at the top and continuously conveying overflow of the foamed substance which gravitates downwardly therethrough from the top of said container back to the pool in said tank, whereby the level of said mound of foamed substance is maintained substantially constant.

2. Apparatus for applying a coating of substance in liquid form as set forth in claim 1 further comprising foam guide means on opposite sides of said container merged with the top of said tank and inclined downwardly to said overflow passageway to receive overflow of said foamed substance and to cause said overflow to gravitate back into said tank automatically for recirculation, and wherein said gas forcing means delivers said gas at a pressure developing gas-filled foam bubbles of said substance which are of the order of about $\frac{1}{16}$ inch in diameter.

3. Apparatus for applying a coating of substance in liquid form as set forth in claim 1 further comprising means forming an inclined surface at the top edge of said container nearer the oncoming transported article and extending in said one direction with an upward inclination, said surface continuously urging said rising mound of foamed substance laterally in said one direction and into said overflow passageway, whereby said foamed mound tends to maintain a predetermined constant maximum height for said wiping contact with said article.

4. Apparatus for applying a coating of liquid soldering flux to printed circuit boards, comprising a framework having a top closure provided with a substantially central opening, a first open-topped tank mounted below the top closure in registry with the opening therein and having a pool of liquid soldering flux therein, conveyor means for transporting the printed circuit boards in one horizontal direction across said top closure and over said open-topped tank at a predetermined level thereabove and at a substantially uniform speed, a second open-topped tank within said first tank extending into and above said pool of soldering flux and in fluid communication with said first tank, said second tank having a substantially vertical open-topped passageway of substantially rectangular cross-section below said level, a hollow substantially cylindrical semi-porous member of length substantially equal to that of said rectangular cross-section mounted substantially horizontally within said passageway below the surface of the liquid flux therein and substantially transversely to said direction, means forcing air under pressure into the interior of said hollow cylindrical member, means sealing the ends of said hollow member against entry of liquid flux therein, a narrow lip fully along the leading edge of the open top of said second tank nearer to the oncoming printed circuit boards and extending rearwardly and upwardly thereof over a narrow portion of the open top of said passageway, and inclined guides merging with the open top of said first tank and sloping upwardly away therefrom below said level to receive and guide overflow of foamed flux from said passageway back into said pool of liquid flux in said first tank.

5. The method of applying to articles a coating of a substance in the form of a liquid which comprises continuously forcing a plurality of small streams of gas into and below the surface of a defined area of a pool of the liquid to thereby develop a self-rising foam, maintaining the other portions of the pool quiescent whereby said self-rising foam rises above the surface of the quiescent portion as a foamed mound of the liquid, advancing the articles to be coated along a path, said path having contact with the foamed mound of liquid so that contact is made with the bottoms of the articles only, simultaneously continuously deflecting the foamed mound of liquid in a lateral direction relative to the surface of the pool of liquid, thereby maintaining the mound of foam at a substantially uniform height, and collecting the excess laterally-deflected foamed liquid which does not coat the articles and guiding it for downward movement under influence of gravity and return to the quiescent portions of the pool for recirculation.

References Cited by the Examiner

UNITED STATES PATENTS

| | | | |
|---|---|---|---|
| 171,688 | 1/1876 | Morewood et al. | 118—429 X |
| 921,192 | 5/1909 | Wheeler | 4—189 X |
| 1,968,687 | 7/1934 | Johnson. | |
| 2,253,060 | 8/1941 | Clearman | 118—429 X |
| 2,269,592 | 1/1942 | McGraw | 118—429 X |
| 2,488,876 | 11/1949 | Newhall et al. | |
| 2,533,167 | 12/1950 | Kilham | 118—429 X |
| 2,703,760 | 3/1955 | Cunning | 99—168 |
| 2,993,272 | 7/1961 | Carlzen et al. | 113—93 X |
| 3,039,185 | 6/1962 | Oates | 118—429 X |
| 3,047,418 | 7/1962 | Compton | 117—37 |
| 3,056,370 | 10/1962 | Barnes et al. | 113—93 |

RICHARD D. NEVIUS, *Primary Examiner.*

JOSEPH B. SPENCER, *Examiner.*